United States Patent [19]
Rosansky et al.

[11] 3,909,303
[45] Sept. 30, 1975

[54] BATTERY CONSTRUCTION WITH PROVISION FOR VENTING ITS CONTENTS

[75] Inventors: Martin G. Rosansky, Monsey; Ignatius Michalko, Ossing, both of N.Y.

[73] Assignee: Power Conversion, Inc., Mount Vernon, N.Y.

[22] Filed: June 17, 1974

[21] Appl. No.: 480,245

Related U.S. Application Data
[63] Continuation of Ser. No. 327,937, Jan. 30, 1973.

[52] U.S. Cl. .............................. 136/177; 136/178
[51] Int. Cl.² ........................................ H01M 2/12
[58] Field of Search ............. 136/133, 177, 178, 135

[56] References Cited
UNITED STATES PATENTS

| | | | |
|---|---|---|---|
| 1,387,350 | 8/1921 | Chamberlain | 136/178 |
| 1,920,799 | 8/1933 | Lilienfeld | 136/178 |
| 2,198,988 | 4/1940 | Binick | 136/178 |
| 2,478,798 | 8/1949 | Williams | 136/178 |
| 3,143,441 | 8/1964 | Coleman | 136/178 |
| 3,415,690 | 12/1968 | Richman | 136/178 |
| 3,676,221 | 7/1972 | Bach | 136/111 |
| 3,706,617 | 12/1972 | Stark et al. | 136/178 |

*Primary Examiner*—Patrick P. Garvin
*Assistant Examiner*—John F. Niebling
*Attorney, Agent, or Firm*—Hopgood, Calimafde, Kalil, Blaustein & Lieberman

[57] ABSTRACT

A battery capable of safely venting its contents without exploding includes a casing which defines a cavity in which the electro-chemical contents of the battery is confined. A rigid partition is disposed across an opening at the end of the casing, and a relatively bendable cover is positioned so that its under surface overlies the partition. A passageway connects the cavity with the under surface of the cover, and the cover is attached to the partition at at least one location. If the internal pressure of the battery reaches a predetermined limit, as may occur if the battery is overheated, the cover is deformed away from the partition to vent the contents. However, the cover does not become detached from the partition.

4 Claims, 3 Drawing Figures

BATTERY CONSTRUCTION WITH PROVISION FOR VENTING ITS CONTENTS

This is a continuation, of application Ser. No. 327,937 filed Jan. 30, 1973.

BACKGROUND OF THE INVENTION

This invention relates to a battery construction which includes provision for venting the contents of the battery at a predetermined internal pressure limit.

A persistent problem associated with the design of many types of batteries is that, under certain conditions, the pressure generated by the electro-chemical system contained within the battery is such that the battery explodes. This pressure may be produced by a chemical reaction or by the expansion of gases in the presence of heat. Many times, the explosion takes the form of the battery cover disposed across an opening at one end of a cylindrical battery casing becoming detached and acting as a projectile. This highly dangerous phenomena may occur if a battery is thrown into a fire or overheated in some other way. Some batteries will explode if, for instance, left in the hot glove compartment of an automobile. In addition, some batteries will produce an explosion if recharged too rapidly, or for too extended a time period. Other explosions have occurred when an attempt has been made to recharge a battery which is not intended to be rechargeable.

This long standing problem in battery construction has taken on added importance with recent advances in high performance batteries. It is desired to use certain electro-chemical systems, such as those used in a lithium battery including sulfur dioxide as a depolarizer, which have a greater propensity than conventional LeClanche cells and other well-known batteries to reach an explosive state because of the high vapor pressure of the electrolite and its volatile nature. One such battery is disclosed in U.S. Pat. No. 3,748,186, issued on July 24, 1973, entitled "Method for Filling Sealed Batteries."

Accordingly, there is presently a need for a new type of battery construction which, in the event of an increase in the internal pressure of the battery, would allow the battery contents to be safely vented without an explosion.

SUMMARY OF THE INVENTION

According to this invention, a battery capable of safely venting its contents without exploding comprises a casing defining a cavity in which the electro-chemical contents of the battery is confined. A rigid partition is disposed across an opening in the casing, and a relatively bendable cover is disposed with its under surface overlying the partition. A means is provided for attaching the cover to the partition at at least one location. Preferably, this means takes the form of a spot weld. A passageway, which may be an aperture in the partition, connects the under surface of the cover with the cavity whereby any internal pressure generated by the contents is applied against the cover which will deform and release the contents without becoming detached from the partition when a predetermined internal pressure limit is reached.

BRIEF DESCRIPTION OF THE DRAWINGS

An understanding of additional aspects of the invention can be gained from a consideration of the following detailed description of various representative embodiments of the invention taken, in conjunction with the appended drawings wherein.

DESCRIPTION OF THE PREFERRED EMBODIMENTS

Figure 1:
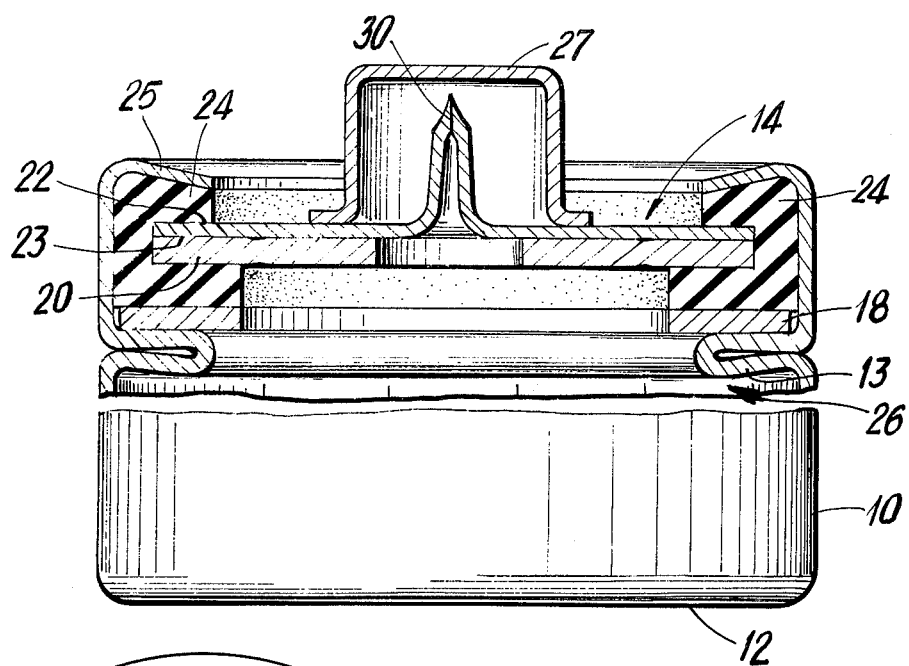
FIG. 1 is a cross-sectional view of a battery constructed in accordance with the invention.

A battery construction capable of safely venting its contents without exploding and designed in accordance with the concept of this invention is shown in FIG. 1. It includes a cylindrical steel battery casing 10 which is closed at its bottom end 12. The casing 10 is necked about its perimeter to form a ridge 13 along the interior of the casing slightly spaced from its opened top end 14. A rigid annual metallic thrust ring 18 is inserted from the open end 14 of the casing 10 and seated against this ridge 13.

Disposed across the open end 14 of the casing 10 is a rigid metal disc-shaped partition 20. A disc-shaped cover 22 of the same size is positioned with its under surface 23 overlying the rigid partition 20. The perimeter of the partition 20 and cover 22 is surrounded and engaged by an annual elastromeric insulator or sealing member 24 which is pressed upwardly by the thrust ring 18 and downwardly by a crimped edge 25 formed by the inwardly bent perimeter of the open end 14 of the casing 10. This construction normally seals a cavity 26 within the casing 10 wherein the electro-chemical system of the battery is confined. (In FIG. 1, only fragments of the vertical side walls are shown, but it will be understood that the casing 10 forms an elongated cylinder). A cap 27 welded atop the center of the cover 22 forms one terminal of the battery.

Figure 2:
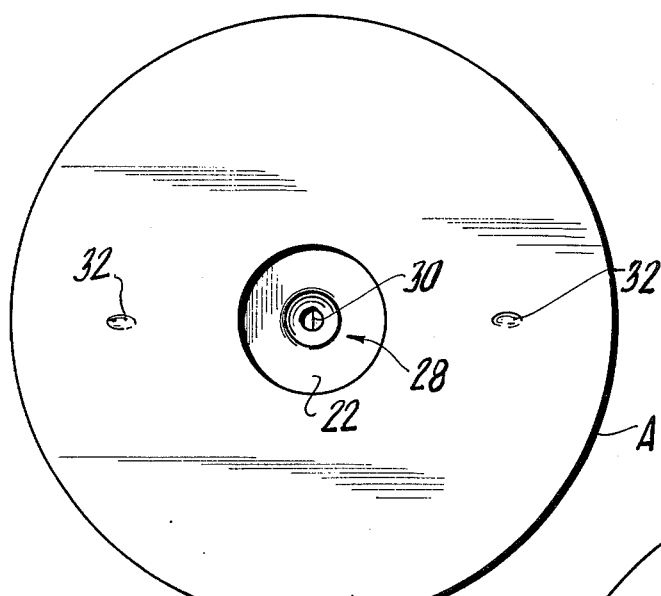
FIG. 2 is a bottom view of a portion of the battery of FIG. 1.

A bottom view of the partition 20 is shown in FIG. 2. The partition includes a centrally located aperture 28 which is aligned with a seam 30 in the cover member 22 which has been closed by cold welding. The cover member 22 is securely attached to the partition 20 by two diametrically opposed spot welds 32. While the partition 20 is rigid, the cover 22 is softer and more ductile, and thus relatively bendable. Any internal pressure within the cavity 26 is applied against the under surface 23 of the cover 22 because that surface 23 is in communication with the cavity 26 through the passageway formed by the aperture 28. If this internal pressure exceeds a predetermined limit, the bendable cover 22 will be permanently deformed so that it pulls away from the crimped upper edge 25 of the casing 10 near the points A on its periphery most distant from the welds 32. Alternatively, the cover may permanently deform and tear near the weld. Thus, the deformation will allow the contents to escape and release the pressure while the cover 22 remains safely and securely attached to the partition 20, thus eliminating the danger from flying projectiles which would otherwise be associated with the release of the internal pressure.

Figure 3:
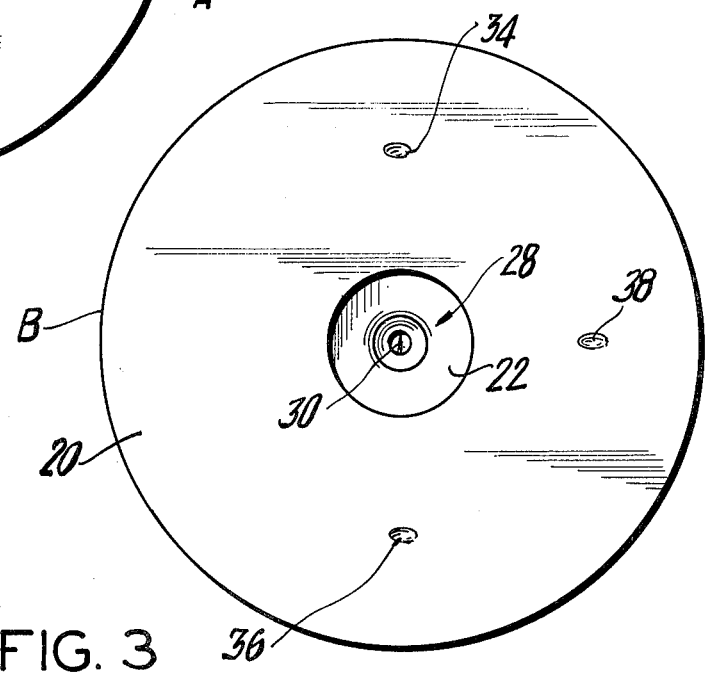
FIG. 3 is a modification of the construction shown in FIG. 2.

The specific configuration depicted in FIG. 2 is shown here only by way of example. It is advantageous, because the pressure limit by which the battery vents can be selected by properly positioning the welds 32. If the battery is intended to vent at a relatively high pressure, the welds 32 are positioned relatively close to the center of the battery, whereas, if the battery is intended to vent a relatively low pressure, the welds 32 will be moved farther apart toward the periphery of the partition 20. There are, however, many other desirable configurations. One shown here, by way of example, in FIG. 3 includes three spot welds 34, 36 and 38, two of which (34, 36) are diametrically opposed, with the third 38 located 90° from each of the first two. Diametrically opposed to the third weld 38 is a point B on the periphery of the partition 20 which is most distant from the spot welds 34. It is near this point B that a release of internal pressure will occur by deformation or tearing of the cover 22, if the selected upper pressure limit is exceeded.

The above described embodiments each form an enclosed steel cavity 26 defined by the casing 10 within which the electro-chemical system of the battery is confined. By way of example, this electro-chemical system may include two electrodes, one of which is lithium, and sulfur dioxide as a depolarizer. However, the invention may be practiced using any sealed electrochemical system presenting a danger of explosion.

Although the invention has been described above with reference to specific embodiments, many modifications and variations therein will readily occur to those skilled in the art. For example, many different methods of attaching the rigid partition and cover to the casing could be substituted for the preferred constructions described herein. Moreover, four spaced by 90° may be used to attach the cover. All such modifications and variations are intended to be included within the scope of the present invention.

We claim:

1. A sealed battery including provisions for preventing an explosion if the internal pressure exceeds a predetermined limit by permitting the battery contents to escape rapidly, said battery comprising:

a casing having an opening at one end thereof and defining a cavity for the electro-chemical contents of the battery;

battery contents confined within said cavity including electrochemical means for generating an electrical current and capable of generating sufficient internal pressure to cause a violent explosion of said battery;

a rigid partition disposed across the opening in said casing and defining an aperture through which said battery contents can escape; and cover means sealing said opening and covering said aperture for containing said battery contents under normal conditions and for rapidly releasing said battery contents if said predetermined pressure limit is reached, said cover means including a metal plate which is relatively soft and bendable in comparison to said partition and which overlies said partition, said plate being welded to said partition at, at least one predetermined confined a location spaced from its perimeter, said plate tearing where welded to permit the rapid release of the contents of the battery when the pressure limit is reached.

2. The battery of claim 1 wherein the cover means is secured to the partition by a spot weld.

3. The battery of claim 1 wherein the partition and the cover means are disc-shaped, the cover means being attached to the partition by two welds diametrically opposed to each other.

4. The battery of claim 1 further comprising a necked portion formed by the casing, a rigid annular thrust ring seated against said necked portion, and an insulating member disposed within the casing and against the thrust ring, said insulating member engaging the periphery of the rigid partition and the cover means.

* * * * *